United States Patent
Kawasumi (10) Patent No.: US 10,712,647 B2
(45) Date of Patent: Jul. 14, 2020

(54) ILLUMINATION APPARATUS AND IMAGE PROJECTION APPARATUS

(71) Applicant: CANON KABUSHIKI KAISHA, Tokyo (JP)

(72) Inventor: Takehito Kawasumi, Saitama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/273,231

(22) Filed: Feb. 12, 2019

(65) Prior Publication Data
US 2019/0250491 A1 Aug. 15, 2019

(30) Foreign Application Priority Data
Feb. 14, 2018 (JP) .................. 2018-023666

(51) Int. Cl.
*G03B 21/20* (2006.01)
*H04N 9/31* (2006.01)

(52) U.S. Cl.
CPC ......... *G03B 21/204* (2013.01); *G03B 21/208* (2013.01); *H04N 9/3155* (2013.01); *H04N 9/3161* (2013.01)

(58) Field of Classification Search
CPC .............. G03B 21/204; G03B 21/208; G03B 21/2013; G03B 21/2033; G03B 21/2053; H04N 9/315; H04N 9/3111; H04N 9/3114; H04N 9/3152; H04N 9/3155; H04N 9/3158; H04N 9/3161
See application file for complete search history.

(56) References Cited

U.S. PATENT DOCUMENTS

| 6,443,576 | B1 | 9/2002 | Nishida et al. |
| 9,244,338 | B2 | 1/2016 | Toyooka et al. |
| 9,274,406 | B2 | 3/2016 | Toyooka et al. |
| 9,772,547 | B2 | 9/2017 | Toyooka et al. |
| 10,416,440 | B2 * | 9/2019 | Hu ........................ G02B 26/008 |
| 2014/0333905 | A1 * | 11/2014 | Sugiyama ................ G03B 9/02 353/97 |
| 2015/0222864 | A1 * | 8/2015 | Inoko ........................ F21V 9/14 353/31 |
| 2018/0239228 | A1 * | 8/2018 | Akiyama ............. G03B 21/204 |

FOREIGN PATENT DOCUMENTS

| JP | 2015179278 A | 10/2015 |
| JP | 2017098202 A | 6/2017 |

* cited by examiner

*Primary Examiner* — Sultan Chowdhury
(74) *Attorney, Agent, or Firm* — Rossi, Kimms & McDowell LLP (57) ABSTRACT

An illumination apparatus includes a first condenser lens configured to collect illumination light including light from the wavelength conversion element, a first lens array including a plurality of lens cells and configured to divide the illumination light from the first condenser lens into a plurality of light fluxes, a second lens array including a plurality of corresponding lens cells configured to receive the light flux from each of the plurality of lens cells in the first lens array. The first condenser lens has a spherical aberration that collects the illumination light at a position on a light source side of the first lens array, and/or a surface apex of a first lens cell disposed on an optical axis side in the first lens array is more eccentric from a contour center of the first lens cell.

13 Claims, 4 Drawing Sheets

FIG. 7

ILLUMINATION APPARATUS AND IMAGE PROJECTION APPARATUS

BACKGROUND OF THE INVENTION

Field of the Invention

The present invention relates to an illumination apparatus suitable for an image projection apparatus (projector).

Description of the Related Art

Some projectors that project an image by modulating illumination light through a light modulation element generate the illumination light as fluorescent light by irradiating excitation light from a light source onto a fluorescent body and by converting the wavelength of the excitation light. The fluorescent body is rotated by a motor so as to suppress a local heat generation from a region on the fluorescent body which receives the excitation light.

The irradiation position of the excitation light in the rotating fluorescent body changes with time in the light irradiation direction (referred to as an optical axis direction hereinafter) due to the unbalance of the motor (such as an installation error), the cambered fluorescent body, or the like. The changing irradiation position of the excitation light in the optical axis direction changes the light use efficiency in the subsequent optical system and the brightness of the image projected on a screen (referred to as the brightness on the screen hereinafter). The rotating fluorescent body causes so-called flickers that fluctuates the brightness on the screen according to a rotation period. Japanese Patent Laid-Open No. 2015-179278 discloses a projector that suppresses the flickers by properly setting the rotational frequency of the fluorescent body and the driving frequency of the light modulation element.

Figure 7:
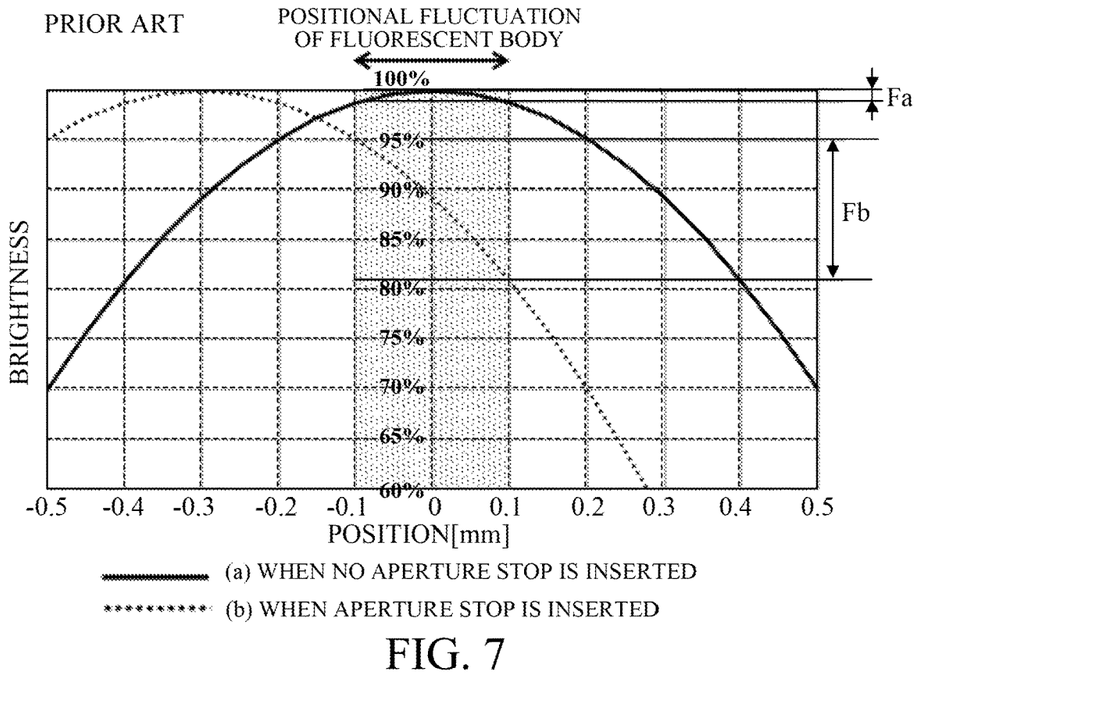
FIG. 7 illustrates the brightness sensitivity on the screen when no aperture stop is inserted and when the aperture is inserted in prior art.

A brightness fluctuation amount caused by the flicker depends on the brightness sensitivity of the subsequent optical system to the position of the fluorescent body in the optical axis direction. FIG. 7 illustrates a relationship (brightness sensitivity curve) between the position of the fluorescent body in the optical axis direction and the brightness on the screen. The abscissa axis illustrates the position of the fluorescent body in the optical axis direction, and the ordinate axis illustrates the brightness on the screen. When the fluorescent body is displaced in + and − directions in the optical axis direction, the brightness on the screen decreases as the displacement width increases. In assembly of the projector, the fluorescent body is fixed at a position zero that maximizes the brightness on the screen. As the fluorescent body rotates, the brightness on the screen fluctuates according to the displacement based on the position zero in the optical axis direction of the fluorescent body. A brightness fluctuation amount on the screen also increases as the displacement width increases in the optical axis direction as the warp of the rotating fluorescent body increases, or the like. Thus, when the brightness sensitivity curve for the displacement of the fluorescent body is used, the flicker degree can be predicted.

In the optical system in the projector, an aperture stop (or diaphragm) may be narrowed (referred to as "an aperture stop is inserted" hereinafter) so as to improve the contrast of the projected image or to adjust the brightness. As illustrated in FIG. 7, in general, a brightness sensitivity curve (b) when the aperture stop is inserted into the optical system has a higher peak than a brightness sensitivity curve (a) when no aperture stop is inserted.

Where no aperture is inserted, a brightness fluctuation amount Fa near the position zero is maintained small with the flicker, because the displacement of the fluorescent body in the optical axis direction is considered on or near the position zero as the peak position. On the other hand, where the aperture stop is inserted, a brightness fluctuation amount Fb near the position zero is larger, because the peak position of the brightness sensitivity curve (b) shifts from the position zero or its vicinity. In other words, when the aperture stop is inserted into the optical system in the projector that emits the fluorescent light by irradiating the excitation light onto the rotating fluorescent body, the brightness fluctuation amount caused by the flicker on the screen is larger than that where no aperture stop is inserted.

SUMMARY OF THE INVENTION

The present invention provides an illumination apparatus and an image projection apparatus using the same, which can suppress flickers when a wavelength conversion element, such as a fluorescent body, rotates and an aperture stop is inserted.

An illumination apparatus according to one aspect of the present invention includes a light source, a wavelength conversion element configured to rotate and to convert wavelength of light from the light source, a first condenser lens configured to collect illumination light including light from the wavelength conversion element, a first lens array including a plurality of lens cells and configured to divide the illumination light from the first condenser lens into a plurality of light fluxes, a second lens array including a plurality of corresponding lens cells configured to receive the light flux from each of the plurality of lens cells in the first lens array, a second condenser lens configured to superimpose the plurality of light fluxes from the second lens array on an illuminated surface, and an aperture stop disposed closer to the illuminated surface than the first lens array. The illumination apparatus satisfies at least one of a condition in which the first condenser lens has a spherical aberration that collects the illumination light at a position on a light source side of the first lens array, and a condition in which a surface apex of a first lens cell disposed on an optical axis side in the first lens array is more eccentric from a contour center of the first lens cell than that of a second lens cell disposed on a peripheral side of the first lens cell so as to collect the light flux toward the position on the optical axis side of the corresponding lens cell.

An image projection apparatus according to another aspect of the present invention includes the above illumination apparatus, and a light modulation element disposed on the illuminated surface, and the image projection apparatus projects the light modulated by the light modulation element onto a projection surface.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
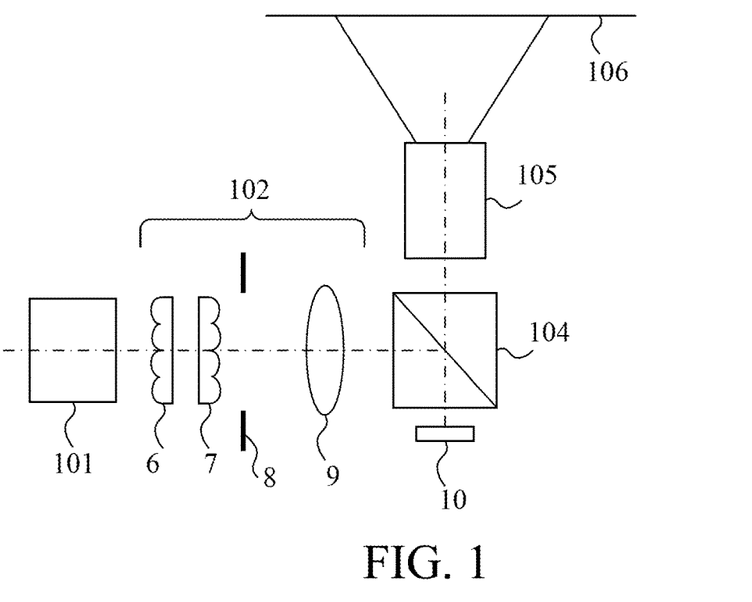
FIG. 1 is a sectional view illustrating a configuration of a projector according to one embodiment of the present invention.

FIG. 1 illustrates a configuration of a projector (image projection apparatus) according to one embodiment of the present invention. A light source unit 101 emits illumination light. An illumination optical system 102 divides the illumination light into a plurality of light fluxes and superimposes the plurality of light fluxes on a light modulation element 10 disposed on an illuminated surface.

A color separation and combination optical system 104 separates white light as illumination light from the illumination optical system 102 into red light, green light, and blue light using a dichroic film, a polarized light separation film, etc., guides these three color light fluxes to the light modulation element 10 provided for each of them. The light modulation element 10 includes a liquid crystal panel, a digital micromirror device, or the like, and is driven based on an image signal input to the projector to modulate the incident light. The color separation and combination optical system 104 combines the red light, the green light, and the blue light as the image light modulated by the three light modulation elements 10, and leads them to a projection optical system (projection lens) 105. The projection optical system 105 enlarges and projects the combined image light onto a screen (projection surface) 106. Thereby, a full color projected image is displayed on the screen 106.

Figure 2:
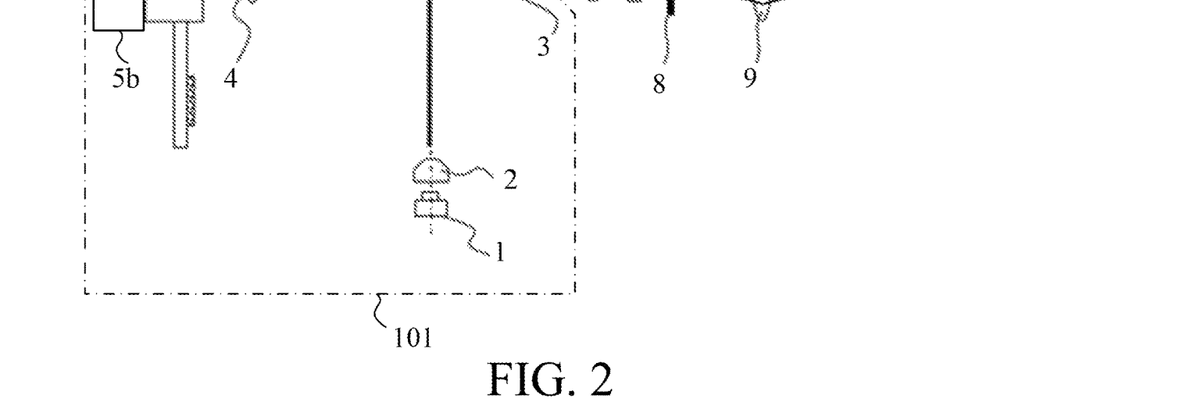
FIG. 2 is a sectional view illustrating a configuration of an illumination apparatus used for the projector according to the embodiment.

FIG. 2 illustrates a configuration of the illumination apparatus that includes the light source unit 101 and the illumination optical system 102. The light source unit 101 includes an excitation light source 1, a collimator lens 2, a dichroic mirror 3, a (first) condenser lens 4, and a fluorescent body wheel 5. The illumination optical system 102 includes a first lens array 6, a second lens array 7, an aperture stop 8 (simply referred to as a stop hereinafter), and a (second) condenser lens 9. AX represents an optical axis of the illumination optical system 102, and a direction in which the optical axis OA extends will be referred to as the optical axis direction.

The excitation light source 1 includes a laser diode (LD) that emits blue light with a wavelength of 455 nm. The excitation light emitted from the excitation light source 1 is divergent light, is converted into parallel light by the collimator lens 2, and travels toward the dichroic mirror 3. The dichroic mirror 3 has a characteristic of reflecting light in a wavelength band of 480 nm or less and of transmitting light in a wavelength band exceeding 480 nm. Hence, the excitation light is reflected by the dichroic mirror 3, enters the condenser lens 4, is collected by the condenser lens 4, and is irradiated onto the fluorescent body wheel 5.

The fluorescent body wheel 5 includes a metallic wheel (substrate) having a high thermal conductivity such as highly reflective aluminum and a ring-shaped fluorescent body (wavelength converting element) 5a fixed on the wheel by a silicon-based binder. The excitation light is irradiated onto the fluorescent body 5a, and its wavelength is converted into the fluorescent light (yellow light) in a wavelength band of 480 to 700 nm. The fluorescent light and the blue light which is part of the excitation light not converted by the fluorescent body 5a are combined into white light. The fluorescent light is reflected directly or by the wheel and travels as the illumination light to the condenser lens 4. The illumination light is collected by the condenser lens 4, is converted into parallel light, transmits through the dichroic mirror 3, and enters the illumination optical system 102.

Each of the first lens array 6 and the second lens array 7 has a plurality of rectangular lens cells 6a and 7a arranged in a lattice pattern. The illumination light incident on the first lens array 6 is divided into a plurality of light fluxes by the plurality of lens cells 6a in the first lens array 6. The plurality of light fluxes enter a plurality of corresponding lens cells 7a in the second lens array 7 corresponding to the plurality of lens cells 6a in the first lens array 6. Then, each light flux is condensed near the second lens array 7, and forms a light source image (referred to as a fluorescent light spot image hereinafter), which is an optical image of a fluorescent light spot (referred to as a fluorescent light spot hereinafter) on the fluorescent body 5a. In other words, a plurality of fluorescent light spot images are formed near the second lens array 7.

The plurality of light fluxes emitted from the second lens array 7 pass through the aperture in the stop 8, are condensed by the condenser lens 9, and are superimposed on the light modulation element 10. Thereby, the modulation surface of the light modulation element 10 is illuminated with a uniform illuminance distribution.

Figure 3A:
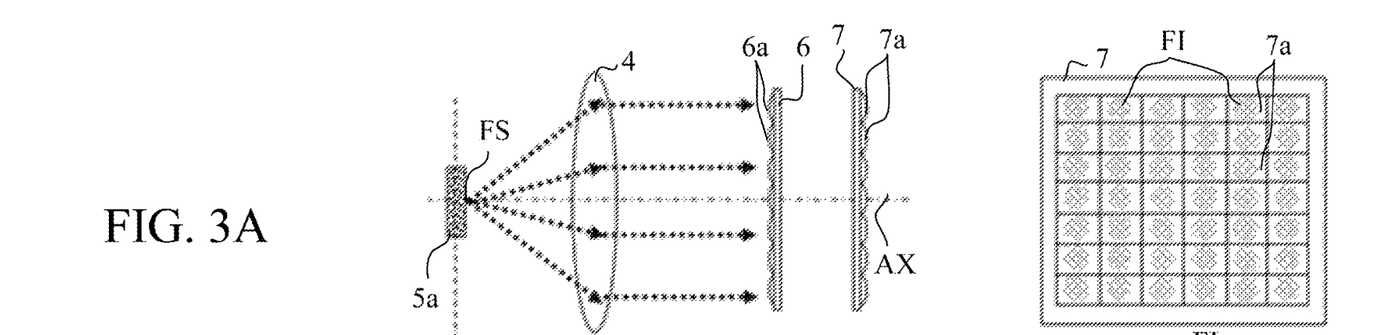
FIGS. 3A to 3C illustrate a relationship between a position of a fluorescent light spot and a light source image near a second lens array according to the embodiment.

When the stop 8 is the most narrowed (referred to as "the stop 8 is inserted" hereinafter), the peak position of the brightness sensitivity curve (a) illustrated in FIG. 7 becomes near the position zero when the fluorescent body 5a is located at a focus position of the condenser lens 4 as illustrated in FIG. 3A. In this state, the fluorescent light generated by the fluorescent body 5a is converted (collimated) into parallel light by the condenser lens 4. This parallel light is divided into a plurality of light fluxes by the plurality of lens cells 6a in the first lens array 6 and a plurality of fluorescent light spot images FI are formed near the plurality of corresponding lens cells 7a in the second lens array 7.

When the entire fluorescent light spot image FI is formed inside the contour of the lens cell 7a in the second lens array 7, the light flux forming the fluorescent light spot image FI reaches a modulation surface of the light modulation element 10. However, when the fluorescent light spot image FI protrudes from the contour of the lens cell 7a, the light flux of the protruding portion reaches the outside of the modulation surface of the light modulation element 10. As a result, the illumination efficiency lowers and the brightness of the projected image on the screen (simply referred to as brightness on the screen hereinafter) also lowers.

As the position of the fluorescent body 5a changes in the optical axis direction as described above, the irradiation position of the excitation light on the fluorescent body 5a changes in the optical axis direction and thus the position of the fluorescent light spot FS on the fluorescent body 5a also changes in the optical axis direction. When the fluorescent light spot FS is located at the focus position (position zero) in the condenser lens 4 as illustrated in FIG. 3A, the illumination light from the fluorescent light spot FS is collimated by the condenser lens 4.

Figure 3B:
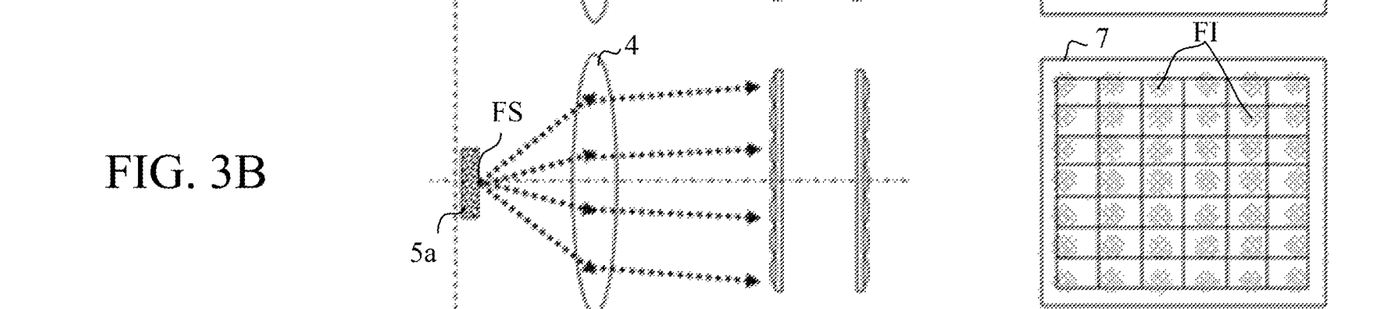

However, as illustrated in FIG. 3B, when the position of the fluorescent light spot FS shifts to the side closer to the condenser lens 4 than the focus position of the condenser lens 4, the illumination light condensed by the condenser lens 4 becomes divergent light rather than parallel light. As illustrated in FIG. 3A, when the parallel light enters the lens cell 6a in the first lens array 6, the fluorescent light spot image FI is formed around the contour center of the corresponding lens cell 7a in the second lens array 7. The contour center of the lens cell is a center or a center of gravity of a shape of the lens cell viewed from the direction parallel to the optical axis AX. On the other hand, when the divergent light enters the lens cell 6a in the first lens array 6, as illustrated in FIG. 3B, the position of the fluorescent light spot image FI shifts from the contour center of the corresponding lens cell 7a in the second lens array 7 in the direction away from the optical axis AX. Thereby, part of the fluorescent light spot image FI projects to the outside of the contour frame of the corresponding lens cell 7a, and the illumination efficiency and finally the brightness on the screen lower.

Figure 3C:
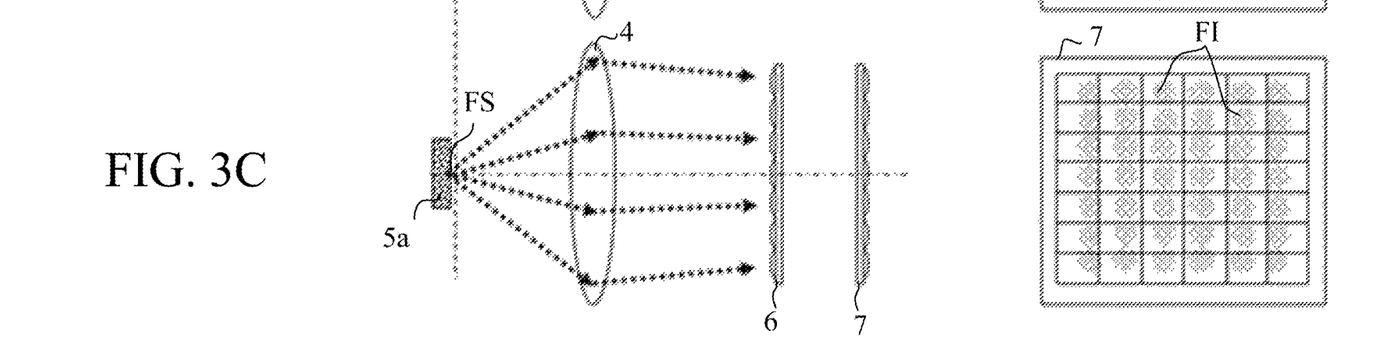

On the other hand, as illustrated in FIG. 3C, when the position of the fluorescent light spot FS shifts to the side far from the condenser lens 4 than the focus position of the condenser lens 4, the illumination light collected by the condenser lens 4 becomes convergent light. When this convergent light enters the lens cell 6a in the first lens array 6, the position of the fluorescent light spot image FI shifts in the direction closer to the optical axis AX from the contour center of the corresponding lens cell 7a in the second lens array 7. Thereby, part of the fluorescent light spot image FI protrudes outside of the contour of the lens cell 7a, and the illumination efficiency and finally the brightness on the screen lower.

As a consequence, as illustrated in the brightness sensitivity curve (a) in FIG. 7, the brightness on the screen is the brightest when the fluorescent light spot FS is located at the focus position of the condenser lens 4, and as the fluorescent light spot FS shifts from the focus position in the + and − directions, the brightness on the screen lowers.

On the other hand, when the stop 8 is inserted into the illumination optical system 102 as in this embodiment, the brightness sensitivity curve changes as follows according to a changing position of the fluorescent light spot FS in the optical axis direction. The stop 8 is made of a metal plate and limits the angle of the illumination light flux illuminating the light modulation element 10. The contrast of the projected image is effectively improved by limiting an incident angle of the illumination light for a viewing angle characteristic of the light modulation element 10 and angular characteristics of the dichroic film, a polarization separation film, etc. of the color separation and combination optical system 104.

Since the light distribution near the second lens array 7 in the illumination optical system 102 corresponds to the angular distribution of the illumination light incident on the light modulation element 10, the stop 8 is located near the second lens array 7 (on the side of the illuminated surface of the first lens array 6). As a result, the inserted stop 8 shields light that are separated from the optical axis AX near the second lens array 7. The position of the fluorescent light spot FS relative to the focus position of the condenser lens 4 and the brightness on the screen have the following relationship.

As in the case where the stop 8 is not inserted, when the fluorescent light spot FS shifts to the side far from the condenser lens 4 than the focus position of the condenser lens 4, the illumination light collected by the condenser lens 4 becomes convergent light (see FIG. 3C). Then, as described above, part of the fluorescent light spot image FI shifted in the direction approaching to the optical axis AX from the contour center of the corresponding lens cell 7a in the second lens array 7 protrudes from the contour of the corresponding lens cell 7a and the illumination efficiency lowers.

However, when the illumination light incident on the first lens array 6 becomes the convergent light, the light distribution range near the second lens array 7 is narrowed correspondingly and thus light shielded by the stop 8 reduces. Hence, the illumination efficiency improves contrary to the reduced illumination efficiency due to the protrusion of the fluorescent light spot image FI. Therefore, even if a shift amount of the position of the fluorescent light spot FS toward the side far from the condenser lens 4 increases, the brightness on the screen improves until the position reaches a specific position. The specific position is defined by a balance between a drop in illumination efficiency as the fluorescent light spot image FI protrudes from the contour of the lens cell 7a in the second lens array 7 and an illumination efficiency improvement as the light shielded by the stop 8 reduces.

When the position of the fluorescent light spot image FI shifts to the side far from the condenser lens 4 beyond the specific position, the illumination efficiency drop due to the protrusion of the fluorescent light spot image FI becomes conspicuous, and the brightness on the screen reduces.

On the other hand, when the position of the fluorescent light spot FS shifts to the side close to the condenser lens 4 from the focus position of the condenser lens 4, the illumination light collected by the condenser lens 4 becomes divergent light (see FIG. 3B). In this case, as described above, part of the fluorescent light spot image FI shifted in the direction away from the optical axis AX from the contour center of the corresponding lens cell 7a in the second lens array 7 protrudes to the outside of the contour of the corresponding lens cell 7a in the second lens array 7, and the illumination efficiency lowers. Moreover, after passing through the second lens array 7, a light amount shielded by the stop 8 also increases. Therefore, when the stop 8 is inserted, the change amount in the brightness on the screen relative to the change amount at the position of the fluorescent light spot FS increases, compared with the case where no stop 8 is inserted.

Thereby, as illustrated in FIG. 7, the peak position of the brightness sensitivity curve (b) when the stop 8 is inserted shifts from the peak position of the brightness sensitivity curve (a) when no stop 8 is inserted. The direction in which the peak position shifts corresponds to the direction in which the fluorescent light spot FS shifts to the side far from the condenser lens 4 from the focus position of the condenser lens 4, which is the direction from the position zero in FIG. 7.

As described above, the position of the fluorescent body 5a is determined to the position zero in FIG. 7 as the position where the brightness on the screen is the maximum when the stop 8 is not inserted. Even with the same displacement amount of the fluorescent body 5a in the optical axis direction when the fluorescent body wheel 5 rotates and the stop 8 is not inserted, the brightness fluctuation on the screen can be kept small, but when the stop 8 is inserted, the brightness fluctuation on the screen increases. Thereby, the user is likely to recognize the flicker on the screen.

This embodiment initially provides the condenser lens 4 with the spherical aberration in the overshoot direction (overcorrection direction) in order to suppress the brightness fluctuation on the screen or the flicker when the stop 8 is inserted. In other words, the condenser lens 4 is given the spherical aberration that condenses the illumination light on the position on the light source side of the first lens array 6 (the incident side of the first lens array 6).

Secondly, this embodiment provides a lens cell (referred to as a first lens cell hereinafter) on the optical axis side or near the optical axis AX among the plurality of lens cells 6a in the first lens array 6 with a shape in which a surface apex is eccentric from the contour center. As illustrated in FIG. 2, the plurality of lens cells 6a in the first lens array 6 include eccentric first lens cells 6a1 on the optical axis side (inside) as described above, and second lens cells 6a2 on a peripheral side (outside) of the first lens cells 6a1. The eccentricity of the first lens cell 6a1 is set such that the light flux passing through the first lens cell 6a1 is converged toward the position closer to the optical axis side in the corresponding lens cell 7a on the optical axis side in the second lens array 7 than that of the light flux passing through the second lens cell 6a2. In other words, the eccentricity is set so as to form a fluorescent light spot image at a position closer to the optical axis side near the corresponding lens cell 7a.

Figure 4A:
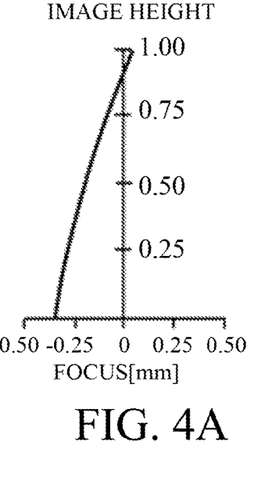
FIGS. 4A to 4C are longitudinal aberration diagrams of a light correction lens and light passing through the light correction lens according to the embodiment.
Figure 4B:
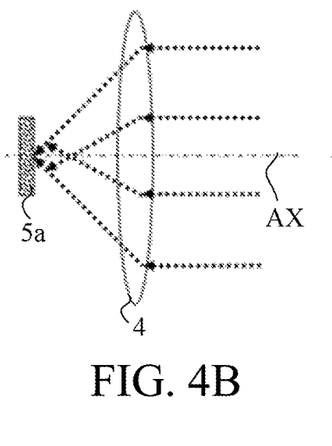
Figure 4C:
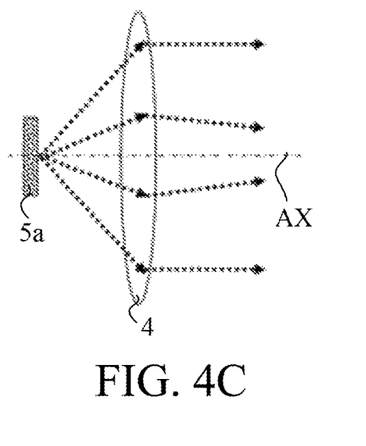

These two characteristic configurations can reduce the brightness fluctuation on the screen when the stop 8 is inserted. The reason will be described later. FIG. 4A illustrates a longitudinal aberration diagram of the condenser lens 4 having the spherical aberration in the overshoot direction. When parallel light enters from the light source side to the condenser lens 4 having the spherical aberration in the overshoot direction, the convergence position differs between a light flux close to the optical axis AX and a light flux far from the optical axis AX. More specifically, as illustrated in FIG. 4B, the light flux near the optical axis AX is focused at a position close to the condenser lens 4, and the light flux far from the optical axis AX is focused at a position far from the condenser lens 4. As illustrated in FIG. 4C, the light flux emitted from the fluorescent light spot FS becomes convergent light near the optical axis AX, and the light flux far from the optical axis AX becomes substantially parallel light.

Figure 5A:
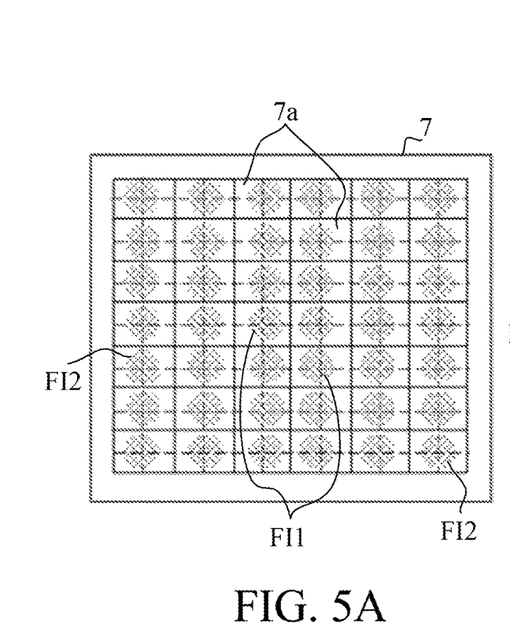
FIGS. 5A and 5B illustrate the position of the fluorescent light spot image relative to the second lens array (lens cell) according to this embodiment.

FIG. 5A illustrates a plurality of fluorescent light spot images FI(n) (FI1, FI2) formed near the second lens array 7 by the first lens array 6 through the condenser lens 4 having the spherical aberration in the overshoot direction. Unlike the first lens cell 6a1, no eccentricity is given to the second lens cell 6a2. At this time, as compared with the fluorescent light spot image FI2 formed by the second lens cell 6a2, the fluorescent light spot image FI1 is formed by the first lens cell 6a1 at a position closer to the optical axis side than the contour center of the corresponding lens cell 7a in the second lens array 7 (inside).

Figure 5B:
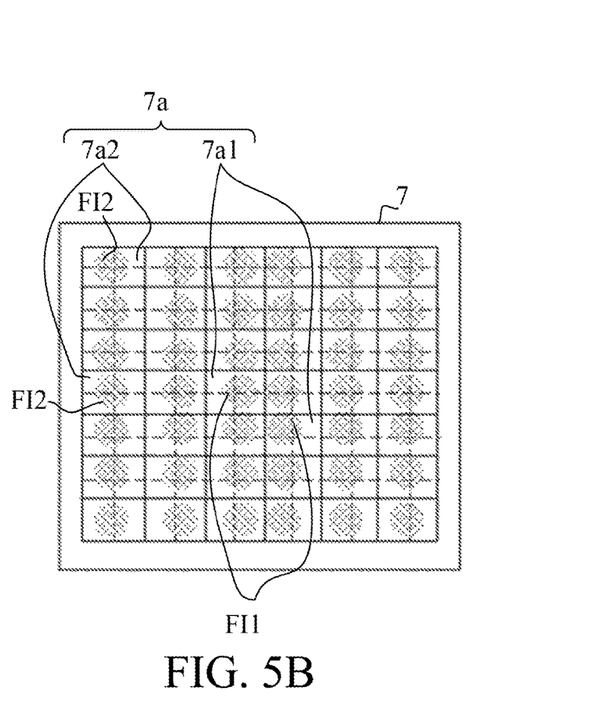

The first lens cell 6a1 itself has the eccentricity as described above. FIG. 5B illustrates a plurality of fluorescent light spot images FI1 and FI2 formed near the second lens array 7 by the first lens cells 6a1 and the second lens cells 6a2 in the first lens array 6. As illustrated, the fluorescent light spot image FI1 formed by the first lens cell 6a1 is closer to the optical axis side from the contour center of the corresponding lens cell 7a1 than the fluorescent light spot image FI2 formed near the corresponding lens cell 7a2 by the second lens cell 6a2. This is the same effect as the spherical aberration in the overshoot direction given to the condenser lens 4.

Figure 6:
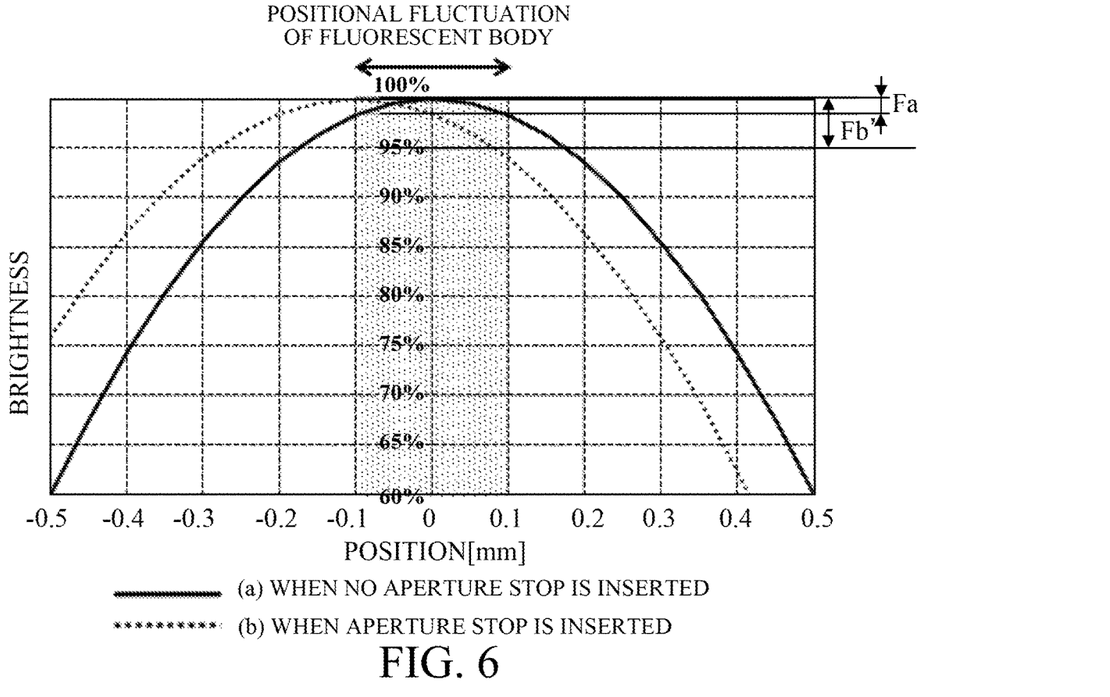
FIG. 6 illustrates the brightness sensitivity on the screen when no aperture stop is inserted and when the aperture stop is inserted according to the embodiment.

Referring now to FIG. 6, a description will be given of an influence in this characteristic configuration relative on the brightness sensitivity curve on the screen relative to the positional change of the fluorescent body 5a in the optical axis direction. In FIG. 6, (a) represents the brightness sensitivity curve when the stop 8 is not inserted, and (b) represents the brightness sensitivity curve when the stop 8 is inserted. In the brightness sensitivity curve (a), the brightness change relative to the position change of the fluorescent light spot has a steep slope. This is due to the spherical aberration of the condenser lens 4 and the eccentricity of the first lens cell 6a1 as described above. In other words, the fluorescent light spot image is formed near the lens cell 7a1 in the second lens array 7 at a position closer to the contour than the contour center of the lens cell 7a1. Therefore, the fluorescent light spot image moves sensitively as the position of the fluorescent body 5a changes, and consequently the illumination efficiency remarkably lowers.

On the other hand, the peak position of the brightness sensitivity curve (b) is close to the peak position of the brightness sensitivity curve (a) when the stop 8 is not inserted. This is due to the following reason. When the stop 8 is inserted, the stop 8 shields the light flux forming the fluorescent light spot image at a position far from the optical axis AX among a plurality of fluorescent light spot images formed near the second lens array 7. Hence, the influence of the fluorescent light spot image formed near the lens cell 7a1 on the optical axis side in the second lens array 7 becomes dominant in the brightness on the screen. When the fluorescent light spot shifts to the side closer to the condenser lens 4 than the focus position of the condenser lens 4 when the stop 8 is inserted, the light condensed by the condenser lens 4 becomes convergent light, thus a light amount shielded by the stop 8 reduces, and the illumination efficiency improves.

On the other hand, since the fluorescent light spot image is formed near the lens cell 7a1 on the optical axis side in the second lens array 7 at a position closer to the optical axis from the contour center of the lens cell 7a1, the illumination efficiency further reduces.

The brightness sensitivity curve (b) has a peak where the improvement and the illumination efficiency drop are balanced. When the spherical aberration of the condenser lens 4 and the eccentricity of the first lens array 6a1 are combined, the illumination efficiency drop due to the eccentricity of the first lens array 6a1 is more conspicuous and the peak position of the brightness sensitivity curve (b) approaches to the position zero.

On the other hand, as the fluorescent light spot shifts from the focus position of the condenser lens 4 toward the side far from the condenser lens 4, the light collected by the condenser lens 4 becomes divergent light and a light amount shielded by the stop 8 becomes larger. Hence, the illumination efficiency lowers. Since the fluorescent light spot image is formed near the optical axis side lens cell 7a1 in the second lens array 7 at a position closer to the optical axis from the contour center of the lens cell 7a1, the illumination efficiency drop is suppressed. Hence, as compared with the case where no spherical aberration is given to the condenser lens 4 and no eccentricity is given to the first lens cell 6a, a shift amount of the peak position of the brightness sensitivity curve (b) from the position zero is reduced.

As a result, a flicker amount on the screen due to the positional fluctuation of the fluorescent light spot when the stop 8 is inserted is much smaller than a case where the spherical aberration is not given to the condenser lens 4 and the eccentricity is not given to the first lens cell 6a1 in the first lens array 6. For example, according to the brightness sensitivity curve (b) in FIG. 7, a brightness fluctuation amount Fb when the position fluctuation of the fluorescent light spot is ±0.1 mm is about 17%. On the other hand, as understood from the brightness sensitivity curve (b) in FIG. 6, this embodiment reduces a brightness fluctuation Fb' down to about 6%.

The brightness sensitivity where the stop 8 is not inserted changes a little steeply as the position of the fluorescent light spot fluctuates but the peak position is originally set based on the position zero and thus the influence of the position fluctuation of the fluorescent light spot is minor.

As described above, this embodiment gives the spherical aberration to the condenser lens 4 and the eccentricity to the first lens cell 6a1 in the first lens array 6 so as to control the position of the fluorescent light spot image formed near the second lens array 7 and to suppress the illumination efficiency drop when the stop 8 is inserted. This configuration can reduce the magnitude of the brightness fluctuation on the screen or the flicker amount generated due to the positional fluctuation of the fluorescent light spot as the fluorescent body wheel 5 rotates.

As described above, each of the spherical aberration in the condenser lens 4 and the eccentricity in the first lens array 6 has the effect of controlling the position of the fluorescent light spot image. Hence, only one of them may be employed. In other words, a flicker amount can be reduced when the stop 8 is inserted by making lamer the spherical aberration in the condenser lens 4 without providing the eccentricity to the first lens array 6, or by providing a larger eccentricity to the first lens array 6 without providing the spherical aberration to the condenser lens 4.

However, an excessively large spherical aberration in the condenser lens 4 would cause the excitation light spot to blur when the excitation light is converged on the fluorescent body 5a, consequently the fluorescent light spot to similarly blur, and to make the fluorescent light spot image lamer. Thereby, the protrusion of the fluorescent light spot image from the lens cell 7a in the second lens array 7 increases and the illumination efficiency further reduces.

Conversely, when the condenser lens 4 has no spherical aberration and the lame eccentricity is given to the first lens array 6, the illumination efficiency does not lower but the excessive eccentricity causes a large thickness difference at the boundary portion between adjacent lens cells. This thickness difference of the boundary portion causes a light amount drop near the contour of the illumination range relative to the light modulation element 10. When the light amount drops on the effective modulation surface of the light modulation element 10, the peripheral portion of the projected image on the screen becomes dark. Although this problem can be avoided by previously setting the uniform illumination distribution range to be larger than the effective modulation surface of the light modulation element 10, the illumination efficiency reduces by uniformly illuminating a wider range.

This embodiment provides the spherical aberration to the condenser lens 4 and the eccentricity to the first lens array 6, maintaining the illumination efficiency drop as low as possible.

The eccentricity in the first lens cell 6a1 may be set such that the portion on the optical axis side of the contour of the fluorescent light spot image (for example, where the brightness of the fluorescent light spot image is half the maximum value) may overlap the portion on the optical axis side of the contour of the corresponding lens cell 7a1 in the second lens array 7. In other words, the eccentricity in the first lens cell 6a1 may be set such that the position of the fluorescent light spot image may close to the center of the second lens array 7. This configuration can reduce the flicker while minimizing the illumination efficiency drop due to the protrusion of the fluorescent light spot image from the contour of the corresponding lens cell 7a1.

The plurality of first lens cells 6a1 in the first lens array 6 may be set so that a first lens cell 6a1 closer to the optical axis AX has a larger eccentricity amount. Where the stop 8 is a movable aperture stop, the smaller its aperture degree is, the larger the shift of the peak position in the brightness sensitivity curve becomes as the position of the fluorescent light spot fluctuates. Thus, the illumination efficiency drop and the flicker can be suppressed regardless of the aperture degree by making larger the eccentric amount of the first lens cell 6a1 that is closer to the optical axis AX.

This embodiment can suppress the flicker when the wavelength conversion element rotates and the aperture stop is inserted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-023666, filed on Feb. 14, 2018, which is hereby incorporated by reference herein in its entirety

What is claimed is:

1. An illumination apparatus comprising:
   a light source;
   a wavelength conversion element configured to rotate and to convert wavelength of light from the light source;
   a first condenser lens configured to collect illumination light including light from the wavelength conversion element;
   a first lens array including a plurality of lens cells and configured to divide the illumination light from the first condenser lens into a plurality of light fluxes;
   a second lens array including a plurality of corresponding lens cells configured to receive the light flux from each of the plurality of lens cells in the first lens array;
   a second condenser lens configured to superimpose the plurality of light fluxes from the second lens array on an illuminated surface; and
   an aperture stop disposed closer to the illuminated surface than the first lens array,
   wherein the illumination apparatus satisfies a condition in which a surface apex of a first lens cell disposed on an optical axis side in the first lens array is more eccentric from a contour center of the first lens cell than that of a second lens cell disposed on a peripheral side of the first lens cell so as to collect the light flux toward the position on the optical axis side of the corresponding lens cell.

2. The illumination apparatus according to claim 1, wherein a portion on the optical axis side of a contour of a light source image formed when the first lens cell collects the light flux overlaps a portion on the optical axis side of a contour of the first lens cell.

3. The illumination apparatus according to claim 1, wherein the surface apex of the second lens cell is not eccentric from the contour center of the second lens cell.

4. The illumination apparatus according to claim 1, wherein the surface apex of one of the plurality of the first lens cells in the first lens array which is closer to the optical axis is more eccentric from the contour center.

5. The illumination apparatus according to claim 1, wherein the aperture stop when most narrowed shields the light flux from the second lens cell, and allows the light flux from the first lens cell to reach the illuminated surface.

6. The illumination apparatus according to claim 1, wherein the illumination apparatus further satisfies a condition in which the first condenser lens has a spherical aberration that collects the illumination light at a position on a light source side of the first lens array.

7. An image projection apparatus comprising:
   an illumination apparatus including a light source, a wavelength conversion element configured to rotate and to convert wavelength of light from the light source, a first condenser lens configured to collect illumination light including light from the wavelength conversion element, a first lens array including a plurality of lens cells and configured to divide the illumination light from the first condenser lens into a plurality of light fluxes, a second lens array including a plurality of corresponding lens cells configured to receive the light flux from each of the plurality of lens cells in the first lens array, a second condenser lens configured to superimpose the plurality of light fluxes from the second lens array on an illuminated surface, and an aperture stop disposed closer to the illuminated surface than the first lens array, wherein the illumination apparatus satisfies a condition in which a surface apex of a first lens cell disposed on an optical axis side in the first lens array is more eccentric from a contour center of the first lens cell than that of a second lens cell disposed on a peripheral side of the first lens cell so as to collect the light flux toward the position on the optical axis side of the corresponding lens cell; and
   a light modulation element disposed on the illuminated surface,
   wherein the image projection apparatus projects the light modulated by the light modulation element onto a projection surface.

8. The image projection apparatus according to claim 7, wherein the illumination apparatus further satisfies a condition in which the first condenser lens has a spherical aberration that collects the illumination light at a position on a light source side of the first lens array.

9. An apparatus comprising:
   a light source;
   a wavelength conversion element configured to rotate and to convert wavelength of light from the light source;
   a first condenser lens configured to collect illumination light including light from the wavelength conversion element;
   a first lens array including a plurality of lens cells and configured to divide the illumination light from the first condenser lens into a plurality of light fluxes;
   a second lens array including a plurality of corresponding lens cells configured to receive the light flux from each of the plurality of lens cells in the first lens array;
   a second condenser lens configured to superimpose the plurality of light fluxes from the second lens array on an illuminated surface; and
   an aperture stop disposed closer to the illuminated surface than the first lens array,
   wherein the apparatus satisfies at least one of a condition in which the first condenser lens has a spherical aberration that collects the illumination light at a position on a light source side of the first lens array, and a condition in which a surface apex of a first lens cell disposed on an optical axis side in the first lens array is more eccentric from a contour center of the first lens cell than that of a second lens cell disposed on a peripheral side of the first lens cell so as to collect the light flux toward the position on the optical axis side of the corresponding lens cell, and
   wherein the aperture stop when most narrowed shields the light flux from the second lens cell, and allows the light flux from the first lens cell to reach the illuminated surface.

10. The apparatus according to claim 9, wherein a portion on the optical axis side of a contour of a light source image formed when the first lens cell collects the light flux overlaps a portion on the optical axis side of a contour of the first lens cell.

11. The apparatus according to claim 9, wherein the surface apex of the second lens cell is not eccentric from the contour center of the second lens cell.

12. The apparatus according to claim 9, wherein the surface apex of one of the plurality of the first lens cells in the first lens array which is closer to the optical axis is more eccentric from the contour center.

13. The apparatus according to claim 9, further comprising a light modulation element disposed on the illuminated surface,
   wherein the apparatus is configured to project the light modulated by the light modulation element onto a projection surface.

* * * * *